May 3, 1938.  H. R. SWANSON ET AL  2,115,793
FRACTIONAL DISTILLATION
Filed Sept. 11, 1930   2 Sheets-Sheet 1
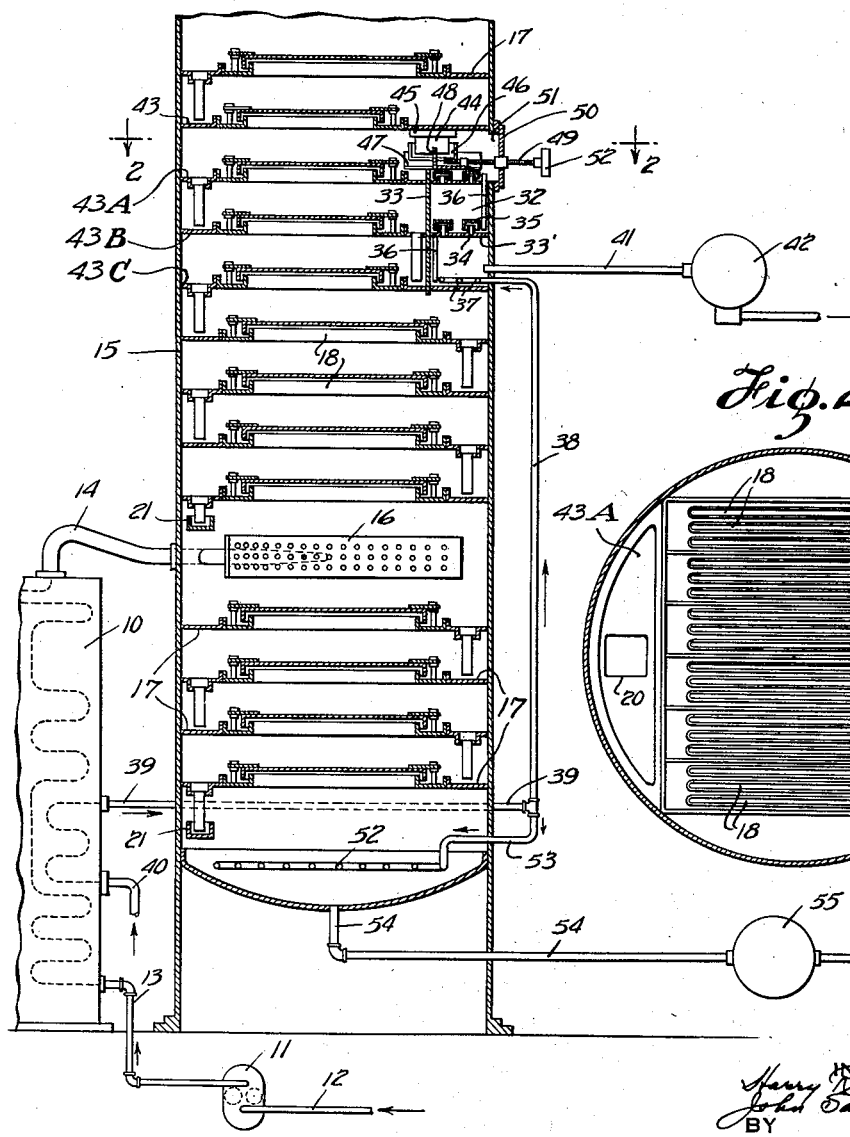

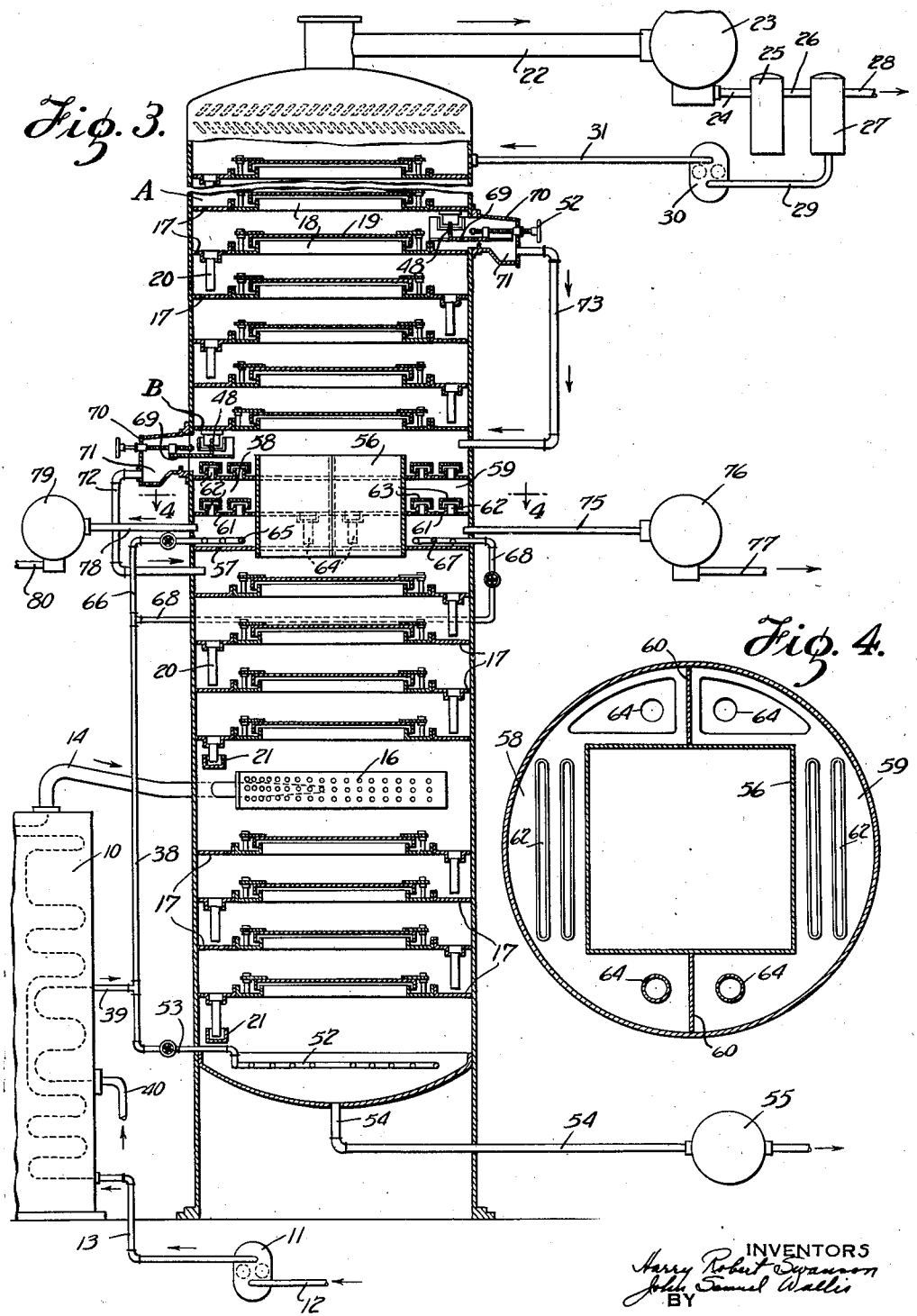

Patented May 3, 1938

2,115,793

UNITED STATES PATENT OFFICE 2,115,793

FRACTIONAL DISTILLATION

Harry Robert Swanson, White Plains, and John Samuel Wallis, New York, N. Y., assignors to Foster Wheeler Corporation, New York, N. Y., a corporation of New York Application September 11, 1930, Serial No. 481,178

9 Claims. (Cl. 196—94)

This invention relates to the fractional distillation of composite liquids and more particularly relates to the fractional distillation of hydrocarbon oils and the like.

Heretofore, in the fractional distillation of hydrocarbon oils and the like, in bringing the one or more side streams taken off from a fractionating tower to initial boiling point and flash specifications, the practice has, in general, been as follows: Each of the side streams has been conducted to a stripping section where the side stream has been passed counter-current to superheated steam in direct contact therewith. Both external and internal stripping sections have been employed for this purpose. The external stripping section, as its name implies, is disposed outside of the fractionating tower at a point somewhat remote therefrom and the side stream is conducted thereto through a suitable conduit. The internal stripping section is located inside of the fractionating tower and is ordinarily disposed immediately below the bubble tray in the tower from which is withdrawn the side stream which supplies the stripping section. The external stripping section, because of its location outside of the fractionating tower, is subjected to heat losses by radiation, etc., and therefore operates at a temperature considerably lower than the temperature of the side stream which is stripped therein. The internal stripping section is normally not subjected to the heat losses of the external stripping section and ordinarily operates at a temperature which is approximately the same as the temperature of the side stream stripped therein. Both of these methods of bringing side streams to specifications have proved disadvantageous in that they both have required the use of comparatively large quantities of steam in order to effect the complete fractionation of the side stream.

In accordance with the present invention, the quantities of stripping steam required to bring the side streams from a fractionating tower to initial boiling point and flash specifications are materially reduced as compared with the quantities of steam heretofore required for this purpose. This is accomplished in general by carrying out the stripping operation inside the fractionating tower at a zone therein in which the temperature is considerably higher than the temperature of the side stream being stripped. With this arrangement, not only is the steam consumption reduced, but the stripping may be carried out in a section arranged in accordance with the present invention which permits a material reduction in the heighth of the fractionating tower as compared with fractionating towers employing the types of internal stripping sections heretofore employed.

The characteristics, features and objects of the present invention will be apparent from the following description taken in connection with the accompanying drawings forming a part thereof, in which:

Fig. 1 is a vertical sectional view of a fractionating tower embodying the present invention, the fractionating tower and the associated equipment being shown more or less diagrammatically;

Fig. 2 is a transverse sectional view of the tower taken substantially on line 2—2 of Fig. 1;

Fig. 3 is a vertical longitudinal section of a fractionating tower embodying another form of the present invention, and Fig. 4 is a transverse sectional view of the tower shown in Fig. 3, taken substantially on line 4—4 of Fig. 3.

Like characters of reference indicate like parts throughout the several views.

Referring to the drawings, 10 represents an oil heater of any suitable type to which oil is supplied by means of charging pump 11 through conduits 12 and 13. A transfer line 14 conducts the heated oil from heater 10 to a fractionating tower 15. The heated oil is discharged against a suitable perforated plate 16 which assists in the separation of the liquid and vaporous constituents of the oil. The fractionating tower 15 has a plurality of spaced bubble trays 17 therein, each of which is provided with elongated vapor uptakes 18 covered by suitable bubble caps 19, and with liquid downflow pipes 20. At certain points in the tower, the lower ends of the downflow pipes 20 are conveniently enclosed in a cup-shaped member 21 to provide suitable liquid seals therefor. A conduit 22 has one end connected to the upper end of the tower 15 and the other end connected to a condenser 23 which is connected by conduit 24 to a water separating tank 25. Conduit 26 connects water separating tank 25 with a reflux tank 27 to which is connected a conduit 28 through which the condensate is passed to storage. Conduit 29 connects reflux tank 27 with reflux pump 30 which pumps reflux into the upper part of fractionating tower 15 through conduit 31.

Stripping sections constructed and arranged in accordance with the present invention are located at desired points throughout the tower. In the fractionating tower illustrated in Fig. 1, only one stripping section is shown, but it will be understood that any desired number may be utilized. The stripping section of the present invention is indicated generally at 32 and, as shown, is arranged at the right hand side of the tower 15 as seen in Fig. 1, and is separated from the tower proper by longitudinally extending partition 33 located approximately midway between the axis of the tower and shell thereof. The stripping section 32 is provided with a suitable number of bubble trays 33' having elongated vapor uptakes 34 covered by bubble caps 35, and with downflow pipes 36. Superheated steam is introduced into stripping section 32 through a perforated coil 37 to which the steam is supplied through pipes 38 and 39 from heater 10. Steam is supplied to the heater 10 through pipe 40. Liquid is withdrawn from stripping section 32 through conduit 41 and is conducted through a cooler 42 to storage. The bubble tray 43 and the bubble trays 43A, 43B and 43C in the zone of stripping section 32 are similar to the bubble trays 17 in the other portions of the tower, except that they are modified in dimensions to accommodate stripping section 32 interiorly of and at one side of the tower.

Liquid oil or reflux is supplied to stripping section 32 from the bubble tray 43 through two spaced downflow pipes 44 connected to sumps 45 in the aforementioned tray 43. The liquid flowing through the downflow pipes 44 flows into reservoirs 45 and is maintained at a level therein which is sufficient to seal the lower end of the downflow pipes 44. Each of the reservoirs 45 is provided with a weir 46 over which the liquid flows into a reflux control valve 47 which is adapted to divide the reflux in any desired proportions. This valve is a modified form of the reflux control valve disclosed in Primrose and Swanson Patent No. 1,893,906 granted January 10, 1933. The valve 47 has a transversely extending dividing wall 48, the ends of which are notched to receive the discharge ends of the weirs 46. The valve 47 is slidably mounted in the tower and is adapted to be moved in a radial direction toward and from the center of the tower and to be retained in any adjusted position by means of an adjusting spindle 49 threadedly engaging the valve and which is supported in a cover plate 50 which closes valve opening 51 in the tower. Spindle 49 has a hand wheel 52 on the outer end thereof by means of which the spindle is operated. Valve 47 divides in any predetermined proportion the reflux flowing downwardly from the bubble tray 43 and causes one of the divided portions to flow into stripping section 32 and the other divided portion to flow on to the bubble tray 43A and thence downwardly through the tower.

Steam is supplied to the bottom of the tower through perforated steam coil 52 connected to steam pipe 39 through pipe 53. Residuum is withdrawn from the tower through conduit 54 and conducted through a cooler 55 to storage.

The operation is as follows: Charging stock is introduced into heater 10 by means of pump 11 through conduits 12 and 13 and is heated to the desired temperature. The vaporous and liquid portions of the heated oil are conducted to the fractionating tower 15 through transfer line 14 and are discharged against perforated plate 16 which aids in the initial separation of the vapors from the unvaporized portion of the oil. The unvaporized portion of the oil flows downwardly over bubble trays 17 into the bottom of the tower and the oil vapors flow upwardly through bubble trays 17. The lightest vapors enter conduit 22 and are condensed in condenser 23 and the condensate is conducted to water separator 25 and thence to reflux tank 27 whence it is returned to the upper part of the tower 15 through conduits 29 and 31 by means of reflux pump 30. The condensate so returned to the tower refluxes downwardly through the tower from tray to tray through downflow pipes 20 and is brought into direct contact with the upflowing vapors. This reflux increases progressively in temperature from the top to the bottom of the tower. Accordingly, the oil vapors passing upwardly through the tower come in contact with reflux which decreases progressively in temperature from the oil inlet to the top of the tower.

The reflux flowing downwardly through downflow pipes 44 from the bubble tray 43 is divided into any desired proportions by control valve 47. The portion which flows to the left of the dividing wall 48 of valve 47, as viewed in Figs. 1 and 2, will flow on to the bubble tray 43A and from thence from tray to tray downwardly through the tower in contact with rising vapors of the oil. The portion flowing to the right of the dividing wall 48 will flow into stripping section 32 disposed at the right hand side of the partition 33, as viewed in Fig. 1, and will there pass counter-current to and in direct contact with superheated steam introduced through perforated coil 37. The low boiling constituents removed from the fraction in stripping section 32 flow upwardly through the stripping section and into and up through the main part of the tower. The fraction which has thus been brought to specifications is withdrawn through conduit 41 and is conducted through cooler 42 to storage.

Inasmuch as there is a material difference in temperature of the liquid on each of the bubble trays throughout the tower, (there being generally a temperature increase of approximately 20° Fahrenheit for each tray from the top to the bottom of the tower) it will be seen that with this arrangement the stripping section 32 is disposed in a temperature zone which is higher than the temperature of the oil that is stripped therein. This is due to the fact that the stripping section, instead of being disposed entirely between bubble plates as in prior arrangements, is disposed at one side of a group of bubble plates and is consequently in the same temperature zone therewith. It is thus apparent that with this arrangement a smaller quantity of steam is required to completely fractionate the side streams than has heretofore been required for this purpose. Another advantage of this arrangement is that the height of the fractionating towers may be considerably reduced as compared with the towers using the type of stripping sections heretofore employed.

Another form of the invention is shown in Figs. 3 and 4. In this form a plurality of stripping sections are arranged in the same temperature zone in the tower. At a temperature zone intermediate the lowest and highest temperature zones of the tower, a rectangular vapor uptake 56 is centrally disposed in the tower. The uptake 56 is supported in position by means of an apertured plate 57 secured adjacent its lower end and which is supported in the tower by any suitable means. As shown, the space between the vapor uptake and the shell of the fractionating tower is divided into two stripping sections 58 and 59 by means of two radially extending and oppositely disposed partitions 60. Each of the stripping sections 58 and 59 is provided with a plurality of superposed bubble trays 61 having vapor uptakes 62 covered by bubble caps 63 and each of the bubble trays 61 is provided with downflow pipes 64. Superheated steam is introduced into stripping section 58 through a perforated coil 65 which is supplied with steam from heater 10 through pipes 66, 38 and 39. Superheated steam is supplied to stripping section 59 through perforated coil 67 to which steam is supplied from heater 10 through pipes 68, 38 and 39. Although this form of invention is shown as applied to only one temperature zone in the fractionating tower, it will of course be understood that as many stripping sections of the form shown in Figs. 3 and 4 may be utilized at various points or zones throughout the tower as may be desired.

The reflux flowing downwardly through the tower is divided at desired points by means of reflux control valves 69. These valves 69 are, in general, similar to the reflux control valve 47 shown in Figs. 1 and 2 and are adapted to divide the reflux into any desired proportions. Each of the valves 69 is provided with a valve casing 70 which is formed to provide a sump 71. The valve 69, which receives reflux from plate 17 located in zone indicated A in Fig. 3, divides the reflux and causes a portion thereof to flow into sump 71 and thence into stripping section 59 through pipe 73. The valve 69, which receives reflux from tray 17 disposed in the temperature zone indicated B, causes a portion of the reflux flowing from the zone B to flow into stripping section 58 and the other portion to pass through by-pass 72 back into the tower below stripping section 58.

Stripping section 58, which receives reflux from the bubble tray 17 in temperature zone B, operates in a temperature zone which is approximately the same as the temperature of the zone B and the liquid oil being stripped therein. Stripping section 59, which receives a portion of the reflux from temperature zone A operates in the same temperature zone as the stripping section 58 and consequently operates at a higher temperature than the temperature of the oil stripped therein.

The operation of the form of the invention shown in Figs. 3 and 4 is as follows: Reflux flowing from temperature zone A on to reflux control valve 69 will be divided, the portion thereof flowing to the left of dividing wall 48 of the valve, as seen in Fig. 3, will flow on to the bubble tray 17 immediately below the valve and thence downwardly through the tower. The portion flowing to the right of dividing wall 48 will be conducted through pipe 73 into stripping section 59. The reflux or liquid oil entering stripping section 59 will be passed counter-current to superheated steam in direct contact therewith. The fraction which has been thus brought to final specifications in stripping section 59 will be withdrawn therefrom through conduit 75 and passed through cooler 76 to storage through conduit 77. Reflux flowing from temperature zone B will be divided as aforesaid by reflux control valve 69, the portion passing to the right of dividing wall 48 of valve 69, as seen in Fig. 3, will flow into stripping section 58 and will there be passed counter-current to superheated steam in direct contact therewith. The portion of the reflux from zone B, which flows to the left of the dividing wall 48 of valve 69, will flow through conduit 72 into the fractionating tower on to the bubble tray 17 immediately below the stripping section 58 thereby by-passing the stripping section. The fraction which has thus been brought to final specifications in stripping section 58 is withdrawn through conduit 78 and is passed through cooler 79 and conduit 80 to storage.

With this arrangement, it will be seen that two stripping sections operate in the same temperature zone in the fractionating tower, one section 59 operating at a substantially higher temperature than the temperature of the oil which is stripped therein and the other section 58 operating at a temperature which is approximately the same as the temperature of the oil which is stripped therein. This arrangement not only effects a reduction in the quantity of steam required to strip the fractions to final specifications, as compared with prior practice, but also, as in the other form of the invention herein disclosed, results in a material reduction in the height of the fractionating tower as compared with towers employing prior types of internal stripping sections.

While the invention has been disclosed as using steam for stripping, it will be understood that its equivalent, in the form of various inert gases, may be utilized for this purpose. Moreover, by carrying out the stripping operations in temperature zones which are higher than the temperature of the liquid being stripped, the desired degree of stripping, in certain instances, may be effected without the use of steam or other such stripping medium.

It will be understood that the invention may be carried out in towers operating at atmospheric pressure or at pressures either higher or lower than atmospheric pressure.

The forms of the invention herein shown and described are to be considered as preferred forms only and it is understood that the invention is not to be limited except by the scope of the appended claims.

What we claim is:

1. Apparatus for fractionally distilling hydrocarbon oils and the like, comprising a tower having a shell provided with a plurality of superposed bubble trays therein adapted to pass vapors of the oil counter-current to reflux oil of progressively decreasing temperature, a vapor uptake in said tower at a point intermediate the lowest and highest reflux temperature sections in the tower, a plurality of stripping sections disposed between said vapor uptake and the shell of the tower, and means for passing oil to different stripping sections from different trays disposed above the stripping sections.

2. The method of fractionally distilling hydrocarbon oils or the like which comprises passing vapors of the oil counter-current to and in contact with a plurality of pools of reflux oil of progressively decreasing temperatures in a fractionating zone, withdrawing reflux from one of said pools and from contact with reflux and vapors flowing in the main vapor path, and subjecting said withdrawn reflux to contact with steam in a stripping zone in which the temperature is higher than the temperature of the reflux in the pool immediately below the pool from which the reflux is withdrawn, the said stripping zone being disposed out of contact with reflux and vapors flowing in the main vapor path.

3. Apparatus for fractionally distilling hydrocarbon oils and the like comprising a fractionating tower, means for passing vapors of the oil counter-current to reflux oil of progressively decreasing temperature comprising a plurality of superposed trays in the tower, means for withdrawing oil from one of said trays and from contact with reflux and vapors flowing in the main vapor path, a stripping section in the tower disposed below said one tray and lower than the tray immediately below said one tray, and means for introducing the withdrawn oil into said stripping section.

4. Apparatus for fractionally distilling hydrocarbon oils and the like, comprising a fractionating section having means for forming liquid oil into a plurality of superposed pools and for passing the liquid oil counter-current to and in contact with oil vapors, a plurality of stripping sections disposed in the fractionating section intermediate two immediately adjacent pools, means for introducing liquid oil into one of the stripping sections from a pool thereabove, means for introducing liquid oil into another stripping section from a pool above the stripping section other than the pool from which liquid oil is introduced into the first mentioned stripping section, and means for introducing steam into each stripping section.

5. Apparatus for fractionally distilling hydrocarbon oils and the like, comprising a fractionating section having means for forming liquid oil into a plurality of superposed pools and for passing the liquid oil counter-current to and in contact with oil vapors, a plurality of stripping sections at the same elevation in the fractionating section, and means for passing oil to different stripping sections from different pools disposed above the stripping sections.

6. Apparatus for fractionally distilling hydrocarbon oils and the like, comprising a fractionating section having means for forming liquid oil into a plurality of superposed pools and for passing the liquid oil counter-current to and in contact with oil vapors, a plurality of stripping sections at the same elevation in the fractionating section, means for introducing liquid oil from one of said pools above the stripping sections into one of said stripping sections, means for introducing liquid oil from another of said pools also above the stripping sections into another stripping section, and means for introducing steam into each stripping section.

7. Apparatus for fractionally distilling hydrocarbon oils and the like, comprising a fractionating section having means for forming liquid oil into a plurality of superposed pools and for passing the liquid oil counter-current to and in contact with oil vapors, a plurality of stripping sections disposed in the fractionating section intermediate two immediately adjacent pools, means for introducing liquid oil into one of the stripping sections from a pool thereabove, means for introducing liquid oil into another stripping section from a pool above the stripping section other than the pool from which liquid oil is introduced into the first mentioned stripping section, and means for introducing steam into each stripping section, said stripping sections being arranged to pass the liquid oil being stripped counter-current to and in contact with the stripping steam.

8. The method of fractionally distilling hydrocarbon oils and the like which comprises passing oil vapors counter-current to and in contact with liquid oil in a fractionating zone, withdrawing part of said liquid oil from contact with vapors at different elevations in the fractionating zone, and separately subjecting each of said withdrawn parts to contact with steam at substantially the same elevation in the fractionating zone.

9. The method of fractionally distilling hydrocarbon oils and the like which comprises passing oil vapors counter-current to and in contact with liquid oil in a fractionating zone, withdrawing part of said liquid oil from contact with vapors at different elevations in the fractionating zone, and separately passing each of said withdrawn parts counter-current to and in contact with steam at substantially the same elevation in the fractionating zone.

HARRY ROBERT SWANSON.
JOHN SAMUEL WALLIS.